United States Patent
Taira

(10) Patent No.: US 6,288,998 B1
(45) Date of Patent: Sep. 11, 2001

(54) OPTICAL DISK AND MANUFACTURING METHOD OF ORIGINAL OPTICAL DISK

(75) Inventor: Kozo Taira, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/267,606

(22) Filed: Mar. 15, 1999

(30) Foreign Application Priority Data

Mar. 13, 1998 (JP) .................................................. 10-062632

(51) Int. Cl.$^7$ .................................. G11B 7/24; B32B 3/00
(52) U.S. Cl. ....................... 369/275.4; 369/277; 428/64.1
(58) Field of Search ............................. 369/275.4, 275.1, 369/13, 277, 278, 276, 275.3, 283; 428/64.1, 64.4, 64.8

(56) References Cited

U.S. PATENT DOCUMENTS 4,674,070 * 6/1987 Tajima et al. ............................ 369/46
5,682,375 * 10/1997 Imataki ............................... 369/275.4
5,904,969 * 5/1999 Kamezaki et al. ................... 428/64.1

* cited by examiner

Primary Examiner—Ali Neyzari
(74) Attorney, Agent, or Firm—Pillsbury Winthrop LLP

(57) ABSTRACT

An original optical disk which is suitable for mass production and facilitates the densification of the optical disks by improving the transferability and the releaseability of an optical disk substrate with respect to a stamper, comprises concavities which constitute pits or grooves along tracks and which include side walls, along the track direction of the concavity, having inclinations such that a width of an opening between sidewalls decrease closer to the base of the concavity in the track width direction of the concavity becomes and such that the inclination has at least one inflection point so that the closer to the bottom side, the sharper the inclination becomes and the closer the opening edge side, the milder it becomes.

9 Claims, 5 Drawing Sheets

OPTICAL DISK AND MANUFACTURING METHOD OF ORIGINAL OPTICAL DISK

BACKGROUND OF THE INVENTION

1. Field of the Invention

The present invention relates to an optical disk having concavities such as pits and grooves and a manufacturing method of an original optical disk for producing such optical disks.

2. Description of Related Art

An optical disk is a recording medium in which information is recorded by pits and phase-change marks which can be read by irradiating a light beam. Such optical disk is drawing much attention as a storage medium having a high density and large capacity memory for use in various information processing systems, including personal computers, and as a recording medium for recording audio and video signals. Presently, research and development to further increase the density and capacity of the optical disks are being actively conducted.

Generally, optical disks are manufactured by creating a stamper from an original disk via a plating step; the steps of duplicating a large number of disk substrates from the stamper by injection molding; and forming a reflection film (such as an aluminum film) or a recording film (such as a phase-change film or a magneto-optic film) on the disk substrate. The original disk is normally created by the steps of: applying a photoresist film on a glass substrate; irradiating an exposing light beam on the photoresist film while being focused by an objective lens; and developing it. Here, pits corresponding to information are formed on the original disk by modulating the intensity of the exposing light beam corresponding to signals of the information to be recorded, and grooves are created on the original disk by irradiating the exposing light beam whose intensity is uniform.

The optical disk, the replica, on which the information is recorded, in the form of pits, may be obtained by creating the stamper from the original disk having the aforementioned pits and by injection molding the reflection film on the disk substrate after transferring the pits on the disk substrate, which made of resin, by using the stamper.

Meanwhile, the replica optical disk having grooves on the recording film for tracking-guiding the light beam may be obtained by creating the grooves on the original disk and by creating the recording film on the disk substrate. In this case, information may be recorded as marks such as phase-change marks on the recording film along the grooves.

The information may be reproduced from the optical disk in which such information is recorded by obtaining reproduced signals by irradiating a reproducing light beam to the optical disk and by detecting reflected lights from the pits and marks by a photodetector.

To increase the density of the optical disk in order to respond to the demand of increased capacity of the optical disk, it is essential that, pits on the optical disk be micronized and the width of a groove be minimized to reduce the track pitch. As for the micronization of pits and groove width in the original optical disk, a micro-processing technology of forming pits and grooves of about 0.2 μm in width is now being developed by shortening a wavelength of the exposing light beam or by using a technology of exposing using an electron beam.

A micro-pit creating technology using a dry-etching technology is also being developed because very small pitches and marks can be read while suppressing cross talk between the adjacent tracks by sharpening inclination of wall faces of pits and grooves.

FIGS. 6 and 7 show sectional profiles of a pit of an optical disk, in the track width direction, created by an original optical disk produced according to prior art methods. The pit in FIG. 6 has side walls along the track direction which are relatively mildly inclined, i.e., which are normally tapered (having an inclination by which the closer the bottom side, the narrower the width of an opening becomes). Meanwhile, the pit in FIG. 7 is normally tapered while having sidewalls along the track direction sharply inclined. The taper having such sharp inclination, as in FIG. 7, may be achieved by using dry-etching in developing the photoresist film.

However, when the pits are micronized in order to densify the optical disk, it becomes difficult to mold the optical disk substrate because the fine pits on the original optical disk must be transferred to the optical disk substrate, i.e., a replica, via the stamper. In particular, it causes problems in mass-producing the replicas by injection molding since resin cannot fully enter within the pits when the inclination of the pit side wall is as sharp as shown in FIG. 7. Thus, not only is the transferability deteriorated but the releaseability of the optical disk substrate from the stamper after the transfer is also adversely affected. These problems apply also to the case of the optical disk whose groove width is reduced.

Furthermore, when a multi-layered recording film is to be formed on this optical disk substrate according to the above-mentioned methods, it becomes difficult for the recording film material to enter within the pits or the grooves to form the recording film when the width of the pit and the groove is narrow and/or the inclination of the side wall is sharp.

As described above, the prior art technology has had the problems of the deterioration of the transferability and the releaseability of the optical disk substrate with respect to the stamper when: pits and grooves are micronized in order to densify the optical disk; the inclination of the side wall of the pit and the groove is sharpened along the side wall; and forming a recording film when the optical disk is a rewritable optical disk; the recording film is a multi-layered film in particular.

SUMMARY OF THE INVENTION

Accordingly, it is an object of the present invention to provide a manufacturing method of an optical disk and an original optical disk suitable for mass-producing such optical disks which facilitates the densification of the optical disks by improving the transferability and the releaseability of an optical disk substrate with respect to a stamper.

A first aspect of an inventive optical disk comprises concavities, which constitute pits or grooves, along tracks and which include side walls, along the track direction of the concavity, having inclinations relative a plane parallel to the base of the concavities so that the closer to the bottom side, the narrower a width of an opening in the track width direction of the concavity becomes, and so that the closer to the bottom side, the sharper the inclination becomes and closer the opening edge side, the milder it becomes.

A second aspect of an inventive optical disk comprises concavities which constitute pits or grooves along tracks and which include side walls, along the track direction of the concavity, having inclinations such that the closer to the bottom side, the narrower a width of an opening in the track width direction of the concavity becomes and such that the inclination is composed of a sharper first inclined portion positioned on the bottom side and a second inclined portion whose inclination is milder than that of the first inclined portion and positioned on the opening edge side.

Preferred embodiments of the present invention with respect to the above-mentioned aspects are as follows:

(1) A depth of the first inclined portion and a depth d2 of the second inclined portion have a relationship of d1>d2, (2) A depth d1 of the first inclined portion and a depth d2 of the second inclined portion have a relationship of d1>2(d2).

(3) A depth d1 of the first inclined portion has a relationship of d1=λ(4n), where λ is wavelength of reproducing light beam and n is refractive index of a disk substrate.

(4) The second inclined portion has a curved portion.

A first aspect of an inventive manufacturing method of an original optical disk for manufacturing optical disks in which concavities which constitute pits or grooves along tracks are created comprises steps of forming a photoresist film on a substrate; exposing the photoresist film; creating a first concavity by developing the photoresist film after the exposure; and creating a second concavity on the substrate continuously from the first concavity by etching the substrate in the thickness direction by masking by the photoresist film on which the first concavity has been created.

Preferred embodiments of the present invention with respect to the above-mentioned aspect are as follows:

(1) The etching in creating the second concavity is anisotropic dry-etching having anisotropy in the depth direction.

(2) The anisotropic dry-etching is reactive ion etching.

(3) The substrate is a silicon or fused silica substrate on which an oxide film or a nitride film is formed.

A second aspect of an inventive manufacturing method of an original optical disk for manufacturing optical disks in which concavities which constitute pits or grooves along tracks are created comprises steps of forming a photoresist film on a substrate; exposing the photoresist film; creating a first concavity by developing the photoresist film after the exposure; creating a second concavity on the substrate continuously from the first concavity by implementing first etching on the substrate in the thickness direction by masking by the photoresist film on which the first concavity has been created; removing the photoresist film after creating the second concavity; and creating an inclination at the opening edge of the second concavity by implementing second etching on the surface of the substrate after removing the photoresist film.

Preferred embodiments of the present invention with respect to the above-mentioned aspect are as follows:

(1) The first etching is anisotropic dry-etching having anisotropy in the depth direction.

(2) The anisotropic dry-etching is reactive ion etching.

(3) The second etching is isotropic dry-etching.

(4) The isotropic dry-etching is chemical dry-etching.

(5) The second etching is anisotropic dry-etching.

(6) The substrate is a silicon or fused silica substrate on which an oxide film or a nitride film is formed.

The specific nature of the invention, as well as other objects, uses and advantages thereof, will clearly appear from the following description and from the following drawings in which like numerals refer to like parts.

DESCRIPTION OF PREFERRED EMBODIMENTS

Preferred embodiments of the present invention will be explained below in detail with reference to the drawings.

Figure 1:
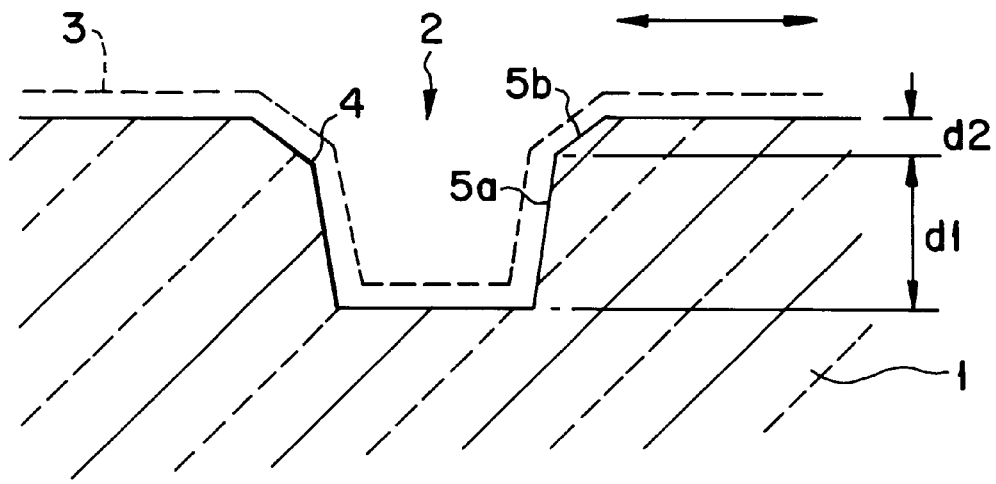
FIG. 1 is a sectional view showing a main part of a structure of an optical disk along a track width direction according to one embodiment of the present invention.

FIG. 1 shows a sectional profile of an optical disk in a track width direction according to one embodiment of the present invention. As shown in the figure, a concave 2 that constitutes a pit or a groove is created on the surface of an optical disk substrate 1 along a spiral or concentric track. Then, a phase-change film or a magneto-optic film, for examples, is formed thereon as a recording film 3. It is noted that in the cases of a read only optical disk, a light reflection film such as an aluminum film is formed, for example, instead of the recording film 3.

Here, the side wall of the concavity 2 along the track direction has an inclination wherein the closer to the bottom of the concavity 2, the narrower a width of an opening with respect to the track width direction of the concavity 2 becomes and has a inflection point 4, so that the closer to the bottom, the sharper the inclination becomes and the closer to the opening edge, the milder the inclination becomes. That is, the side wall of the concavity 2 along the track direction is composed of a sharp first inclined portion 5a positioned on the bottom side and a second inclined portion 5b whose inclination is milder than that of the first inclined portion 5a positioned from the opening edge side-with the inflection point 4 therebetween in the example shown in FIG. 1. When depths of the first and second inclinations 5a and 5b are set as d1 and d2, respectively, the relationship between them is d1>d2, preferably d1>2(d2).

Because the opening edge of the concavity 2 is formed by the second inclined portion 5b whose inclination is mild in the optical disk constructed as described above, a flow of resin, which is a material of the substrate in injection-molding the optical disk substrate 1 using the stamper, becomes smooth, thereby improving the transferability. Further, because the opening is not acute, the optical disk substrate 1 may be released readily from the stamper after molding the optical disk substrate 1.

Furthermore, the width of the opening of the concavity 2 increases, as compared to the case when the wall of the concavity has a uniform sharp inclination, by providing the second inclined portion 5b whose inclination is mild on the side wall of the concavity 2 along the track direction. However, its influence to the reproduction of signals is small, because a half-value width of the concavity 2 (width of the concavity 2 at the position where depth thereof is half) is the same by setting the depth d2 of the second inclined portion 5b to be smaller than the depth d1 of the first inclined portion 5a whose inclination is sharp. According to the calculation implemented by the inventors of the present invention, the depth d1 of the first inclined portion 5a is desirable to be λ(4n) (λ: wavelength of reproducing light beam, n: refractive index of the disk substrate 1) when the inclination of the first inclined portion 5a is almost 90° in order to obtain on enough amplitude of the reproducing signal.

Because the second inclined portion 5b is created in order to enhance the moldability (transferability and releaseability) of the optical disk substrate 1, its depth d2 needs not be so large and is sufficient to be less than a half of the depth d1. It is possible to suppress the drop of modulation transfer function (MTF) caused by the exterison of the pit to a negligible degree by suppressing the depth d2 of the second inclined portion 5b to be less than the half of the depth d1.

A concrete numerical example will be shown below. An optical disk having a track pitch of 0.4 μm and pits, i.e., the concavity 2, whose length is 0.2 to 1.0 μm and whose width (half-value width) is 0.2 μm was created. Further, the wavelength λ of the reproducing light beam was set at 420 nm and the refractive index n of the optical disk substrate 1 at 1.5. The inclination of the first inclined portion 5a of the wall of the pit was set at about 80° and the depth d1 thereof was set at 70 nm. The inclination of the second inclined portion 5b was set at 45° and the depth d2 thereof was set at 30 nm.

Figure 2A:
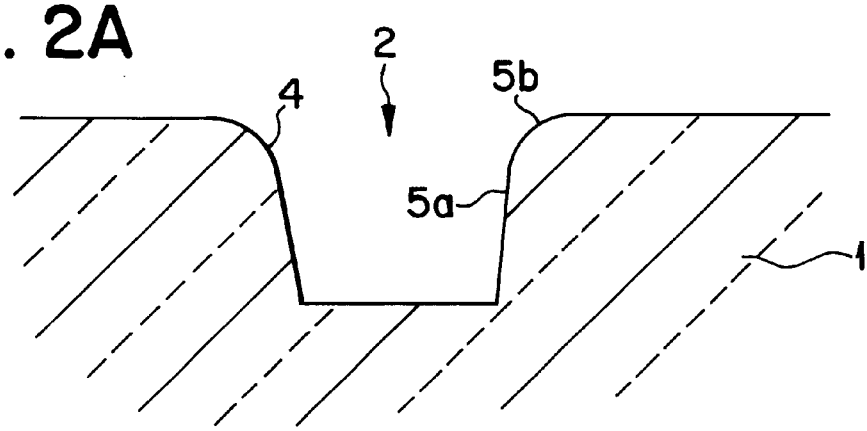
FIGS. 2A and 2B are sectional views showing a main part or a structure of an optical disk along a track width direction according to another embodiment of the present invention.
Figure 2B:
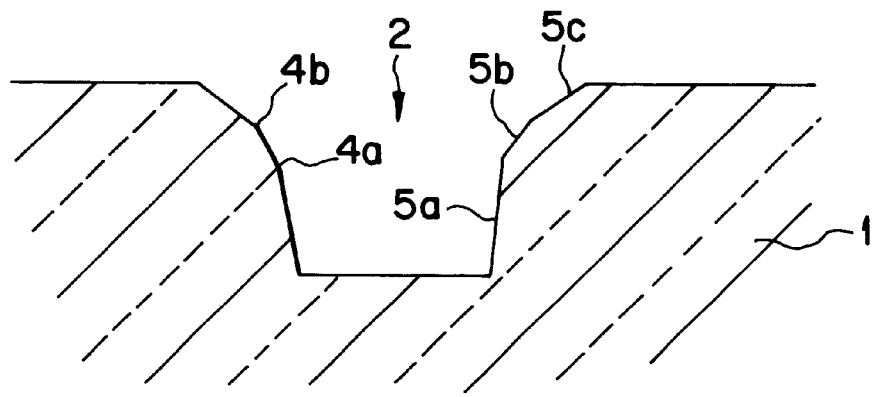

FIGS. 2A and 2B show sectional profiles of optical disks in a track width direction according to another embodiment of the present invention. FIG. 2A shows an example in which the second inclined portion 5B has a curved section and FIG. 2B shows an example in which a wall of the second inclined portion 5b in the track width direction is composed of first, second and third inclined portions 5a, 5b and 5c with two inflection points 4a and 4b therebetween. The inclination is sharpest in the first inclined portion 5a and becomes milder in the order of the second and third inclined portions 5b and 5c. The same effect with the first embodiment may be obtained also by these examples shown in FIGS. 2A and 2B.

Next, a manufacturing method of an original optical disk for producing the inventive optical disks described above will be explained.

Figure 3A:
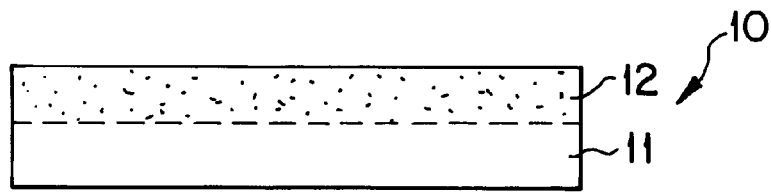
FIGS. 3A to 3E are step-wise sectional views for illustrating a manufacturing method of an original optical disk according to one embodiment of the present invention.

FIGS. 3A to 3E show manufacturing steps of the original optical disk according to one embodiment of the present invention. First, a substrate 10 for the original disk is prepared as shown in FIG. 3A. This substrate 10 comprises a silicon oxide film (BiO$_2$ FILM) 12 is formed on the surface of a silicon (Si) or fused silica substrate 11. The silicon oxide film 12 is formed by thermally oxidizing the surface of the silicon or fused silica substrate 11. It is noted that a silicon nitride film (Si$_3$N$_4$ film) may be formed instead of the silicon oxide film 12.

Figure 3B:
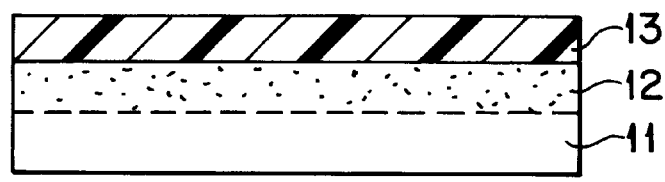

Next, a photoresist film 13 is formed on the substrate 10 as shown in FIG. 3B, for example, by applying the photoresist film by a spinner.

Figure 3C:
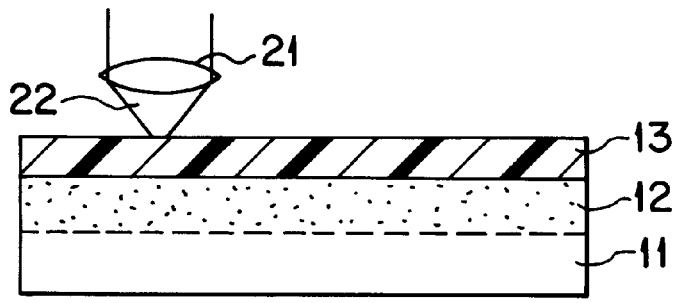
Figure 3D:
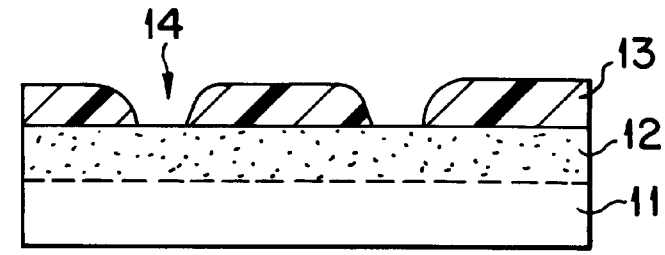

Then, a laser beam 22 being focused by an objective lens 21 is irradiated as shown in FIG. 3C to expose the photoresist film 13 with a predetermined track pitch corresponding to predetermined shapes of pit or of groove. The step of FIG. 3C is a so-called original disk recording step.

Next, a first concavity 14 is created on the photoresist film 13 by developing the photoresist film 13 after the exposure using an adequate etching solution, i.e., by etching and removing the exposed portion.

The steps in FIGS. 3A to 3D described above are similar to the prior art processes for manufacturing the original disk. In the present embodiment, however, anisotropic dry-etching having anisotropy in the depth direction is carried out by using the photoresist film 13 as a mask after the developing step in FIG. 3D to create a second concavity 15 that continues from the first concavity 14 on the surface of the original disk 10 right under the first concavity 14 created through the photoresist film 13, i.e., within the silicon oxide film 12.

It is noted that for the anisotropic dry-etching having anisotropy in the depth direction, an RIE (Reactive Ion Etching) method using CF$_4$, CHF$_3$ or the like as etching gas may be used. Although the original substrate 10 may be a glass substrate in this case, the dry-etching may be carried out more readily by using the silicon or fused silica substrate 11 on which the silicon oxide film 12 is formed in the present embodiment.

Here, while the first concavity 14 has a side wall along the track direction which is mildly inclined by the isotropic etching, the second concavity 15 has a disk wall along the track direction which is sharply inclined by the anisotropic dry-etching in the depth direction.

That is, the wall face on the second concavity 15 corresponds to the first inclined portion 5a shown in FIG. 1 and the wall face of the first concavity 14 corresponds to the second inclined portion 5b in FIG. 1. At this time, the depth of the first concavity 14 (the depth d2 of the second inclined portion 5b in FIG. 1) is determined by the thickness of the photoresist film 13 and the depth of the second concavity 15 (the depth d1 of the first inclined portion 5a in FIG. 1) is determined by the etching depth of the anisotropic dry-etching in FIG. 3E.

Thus, the original optical disk having the same shape with the optical disk substrate 1 shown in FIG. 1 may be obtained through the processes of manufacturing the original in FIGS. 3A to 3E.

Figure 3E:
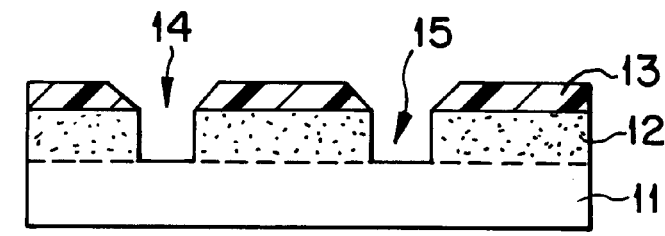

After creating the original optical disk in FIG. 3E, optical disks are manufactured through the same steps with the prior art technology. That is, the optical disk shown in FIG. 1 may be manufactured by steps of: fabricating a nickel stamper, for example; using the original optical disk by means of plating (electroforming); injection molding the optical disk substrate 1 by using the stamper; and by forming the recording film 3 on the optical disk substrate 1.

At this time, because the original optical disk in FIG. 3E has the second concavity 15 having the sharply inclined wall face at the bottom side and the first concavity 14 having the mildly inclined wall face at the opening edge side, the moldability (transferability and releaseability) in the injection-molding the optical disk substrate 1 by using the stamper fabricated from the original is improved, thus improving the mass-productivity. Further, because a material of the recording film readily enters within the second concavity 15 through the first concavity 14 whose inclination is mild in forming the recording film 3 of the optical disk substrate 1, the recording film 3 having a good configuration may be formed even when it is a multi-layered film.

Next, a manufacturing method of an original optical disk according to another embodiment of the present invention will be explained with reference to FIGS. 4A to 4C. The steps for manufacturing the original of the present embodiment are same with the preceding embodiment up to the steps of FIGS. 3A to 3E, and the step in FIG. 4A is same with the step in FIG. 3E.

Figure 4A:
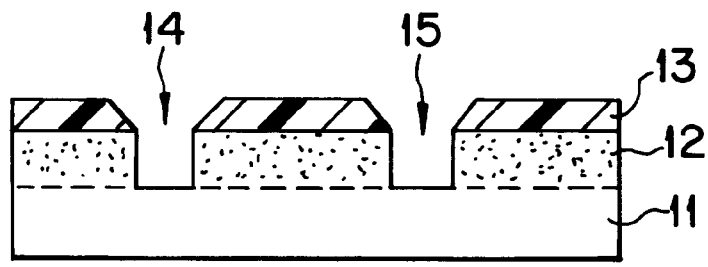
FIGS. 4A to 4C are partial step-wise sectional views for explaining a manufacturing method of an original optical disk according to another embodiment of the present invention.
Figure 4B:
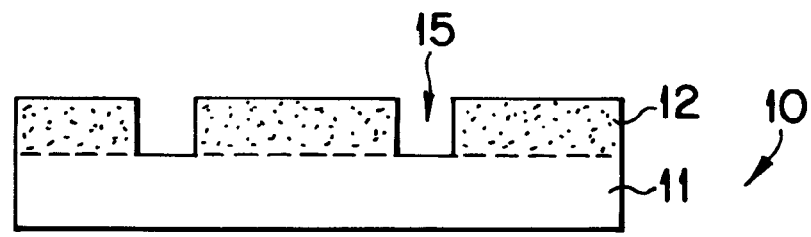

In the present embodiment, the photoresist film 13 is removed by ashing as shown in FIG. 4B after the step in FIG. 4A. Then, dry-etching or preferably, isotropic dry-etching is implemented on the whole surface of the substrate 10 for a relatively short time to create a mile inclination at the opening edge of the concavity 15 as shown in FIG. 4C. that is, although the bottom of the concavity 15 is not etched in the step in FIG. 4C by using etching gas whose selection ration is different between silicon and silicon oxide in etching (because the silicon oxide film 12 has been removed from the bottom of the concavity 15 in the step in FIG. 4A and the surface of the non-oxide silicon substrate 11 is exposed), part around the opening edge of the concavity 15 formed by the silicon oxide film 12 is etched by the step in FIG. 4C and ends up having the mild inclination to become a part of the concavity 15.

Figure 4C:
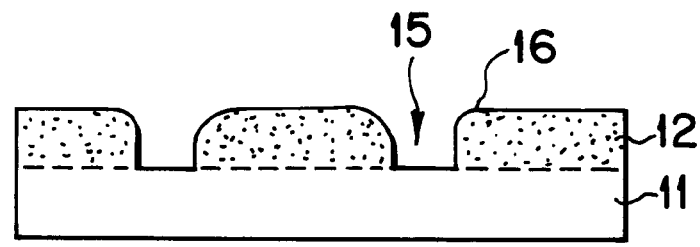

A CDE (Chemical Dry-Etching) method, for example, may be used for the isotropic dry-etching used in the step in FIG. 4C. It is noted that it is not necessary to always use the isotropic dry-etching in the step in FIG. 4C, and the anisotropic dry-etching may be used depending on conditions of the etching.

Thus, the original optical disk having the same shape with the optical disk substrate 1 shown FIG. 1 may be obtained by creating the sharp inclination corresponding to the first inclined portion 5a in FIG. 1 at the bottom side of the concavity 15 and by creating the mild inclination corresponding to the second inclined portion 5b in FIG. 1 near the opening edge side.

After creating the original optical disk in FIG. 4C, optical disks are manufactured through the same steps with the prior art method. That is, the optical disk shown in FIG. 1 may be manufactured by the steps of: fabricating a nickel stamper, for example, using the original optical disk by means of plating (electroforming); injection molding the optical disk substrate 1 by using the stamper; and by forming the recording film 3 on the optical disk substrate 1.

Next, an original disk recording unit for manufacturing the original optical disk described above will be explained with reference to FIG. 5.

Figure 5:
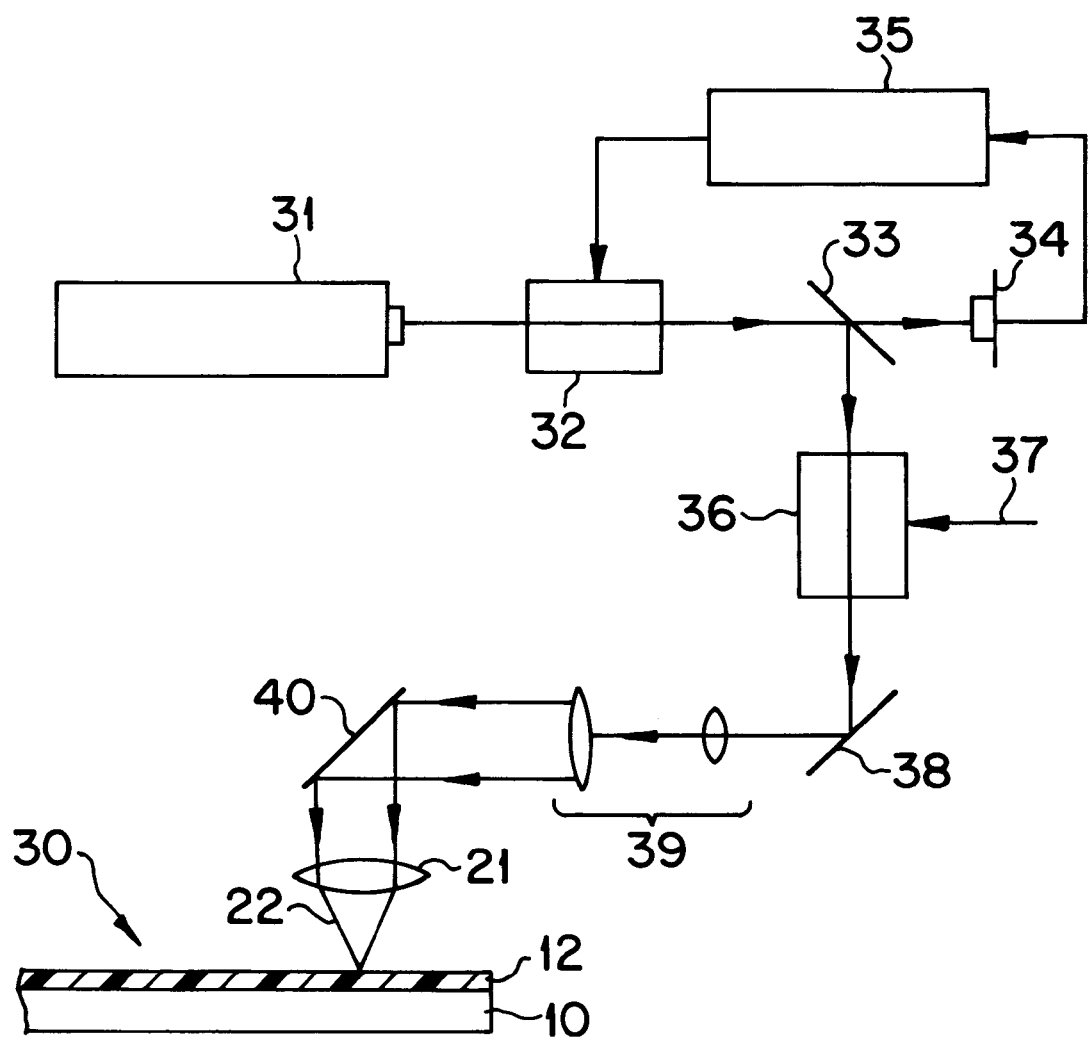
FIG. 5 is a block diagram showing a structure of an original disk recording unit according to one embodiment of the present invention.
Figure 6:
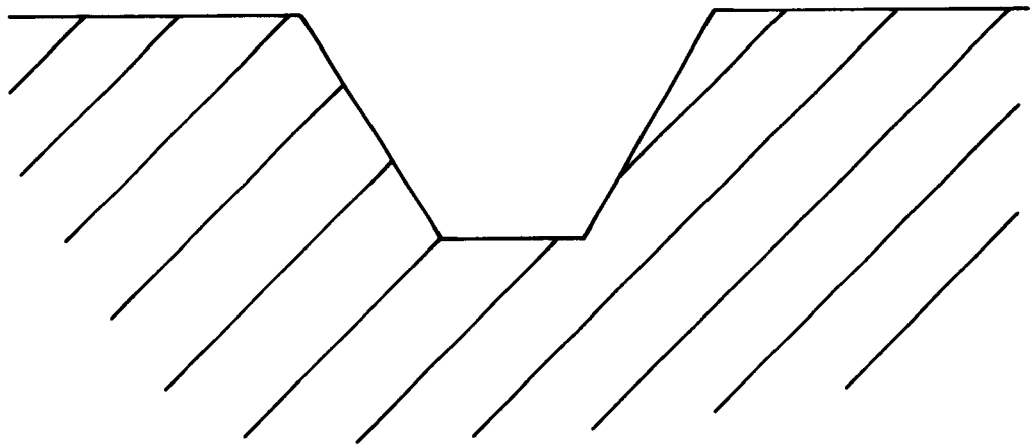
FIG. 6 is a sectional view showing a main part of a structure of a prior art optical disk along a track width direction.
Figure 7:
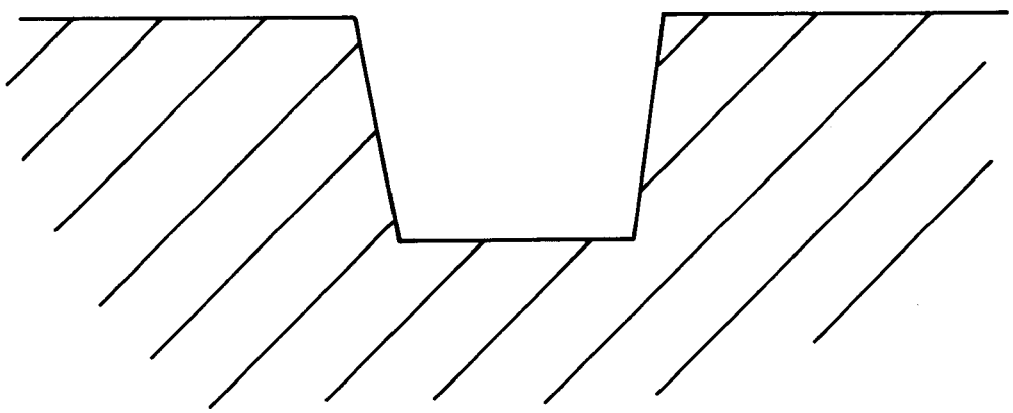
FIG. 7 is a sectional view showing a main part of a structure of another prior art optical disk along a track width direction.

In FIG. 5, a laser beam outputted from a laser generator 31, i.e., a light source for exposure, enters a first light modulator 31. The light outputted from the light modulator 32 is divided into two beams by a half mirror 33. The beam transmitting through the half mirror 33 enters a photodetector 34 for monitoring power to monitor the light power thereof. A light control system 35 implements feedback control on the first light modulator 32 so that the light power monitored by the photodetector 34 becomes constant.

Meanwhile the laser beam reflected by the half mirror 33 enters a second light modulator 36 and undergoes light modulation corresponding to an information signal 37 to be recorded here. The laser beam outputted from this light modulator 36 is guided by a mirror 38 and is collimated by a collimating system 39 composed of several lenses. Then, the laser beam is guided by a mirror 40 to enter the objective lens 21. Then, an exposing light beam 22 being focused by the objective lens 21 to a spot having an adequate diameter is directed to an original disk 30.

On the original disk 30 is what the photoresist film 13 is applied and formed specifically, on the original substrate 10 comprising the circular silicon or fused silica substrate 11 on which the silicon oxide film 12 is formed as described in FIGS. 3A to 3E. when the exposing light beam 22 is irradiated to the photoresist film 13, the exposure is carried out. At this time, the length and width of a pit created by developing the photoresist film 13 in the vicinity of the spot size of the exposing light beam 22 may be controlled by changing the beam diameter of the exposing light beam 22. When an oscillation wavelength of the laser generator 31 is 351 nm and NA of the objective lens 21 is 0.9, a half-value width of the spot of the exposing light beam 22 turns out to be almost 0.2 $\mu$m. Then, the original disk recording step shown in FIG. 3D may be carried out by developing the original disk 30 after the exposure.

Thereafter, the original optical disk shown in FIG. 3E or in FIG. 4C may be obtained by carrying out the steps explained in FIG. 3E or in FIGS. 4A to 4C.

It is noted that although the above-mentioned embodiments have been described mainly about the rewritable optical disk, the present invention is applicable also to read-only optical disks.

As described above, the flow of resin in injection-molding the optical disks by using the stamper becomes smooth and the transferability if improved by inclining the side wall mildly along the track direction of the concavity such as a pit and a groove provided along the track in the inventive optical disk. Further, because the opening edge is not acute, the optical disk may be released readily after its molding. Still more, because the material of the recording film enters within the concavity readily in forming the recording film, it may be formed readily even when it is a multi-layered film.

Further, although the opening width of the concavity increases, as compared to the case when the side wall is uniformly and sharply inclined, by providing the mild inclination at the side wall along the track direction, the half-value width of the concavity may be kept the same by reducing the depth of the mildly inclined portion to be less than the depth of the sharply inclined portion (so that its influence to a reproducing signal becomes small), a reproducing signal having an enough amplitude may be obtained and the drop of MTF caused by the extension of the concavity may be suppressed to a negligible degree.

Still more, the present invention can provide the manufacturing method of the original optical disk suitable for manufacturing such optical disks.

While the preferred embodiments have been described, variations thereto will readily occur to those skilled in the art within the scope of the present invention concepts which are delineated by the following claims.

What is claimed:
1. An optical disk, comprising:
concavities along a track direction of said optical disk, said concavities having a base and two side walls extending outwardly from ends of said base along said track direction, wherein
said side walls are shaped such that a width of an opening between said side walls decreases closer to said base;
said side walls have an inclination relative to a plane parallel to said base such that the inclination becomes sharper closer to said base;
said side walls comprise a first inclined portion, a second inclined portion positioned further away from said base than said first inclined portion, said first inclined portion having an inclination relative to a plane parallel to said base that is sharper than an inclination of said second inclined portion; and a depth d1 of said first inclined portion has a relationship of d1=$\lambda/(4n)$, where $\lambda$ is wavelength of reproducing light beam and n is refractive index of a disk substrate of said optical disk.

2. An optical disk, comprising:

concavities along a track direction of said optical disk, said concavities having a base and two side walls extending outwardly from ends of said base along said track direction, wherein said side walls are shaped such that a width of an opening between said side walls decreases closer to said base;

said side walls comprise a first inclined portion, a second inclined portion positioned further away from said base than said first inclined portion, said first inclined portion having an inclination relative to a plane parallel to said base that is sharper than an inclination of said second inclined portion; and a depth d1 of said first inclined portion has a relationship of d1=$\lambda/(4n)$, where $\lambda$ is wavelength of reproducing light beam and n is refractive index of a disk substrate of said optical disk.

3. The optical disk according to claim 2, wherein a depth d1 of said first inclined portion and a depth d2 of said second inclined portion have a relationship of d1>d2.

4. The optical disk according to claim 1, wherein a depth d1 of said first inclined portion and a depth d2 of said second inclined portion have a relationship of d1>2(d2).

5. The optical disk according to claim 2, wherein said second inclined portion is curved.

6. The optical disk according to claim 2, wherein said second inclined portion comprises a first section, a second section positioned further away from said first inclined portion, said first section having an inclination relative to a plane parallel to said base that is sharper than an inclination of said second section.

7. The optical disk according to claim 2, wherein said concavities are pits.

8. The optical disk according to claim 2, wherein said concavities are grooves.

9. The optical disk according to claim 1, wherein said concavities are grooves.

* * * * *